Patented Apr. 27, 1943

2,317,876

UNITED STATES PATENT OFFICE 2,317,876

MANUFACTURE OF MIRRORS

Elmer J. Ballintine, Tarentum, Pa., assignor to Pittsburgh Plate Glass Company, Allegheny County, Pa., a corporation of Pennsylvania No Drawing. Application March 31, 1941, Serial No. 386,031

4 Claims. (Cl. 117—35)

The present invention relates to the manufacture of mirrors and more particularly to a process of silvering glass sheets.

One object of the invention is the provision of a process in which the deposition of silver from a silvering solution can be confined to a single surface of a glass sheet.

A second object of the invention is the provision of a process in which the face of a glass plate undergoing a silvering operation is desensitized in order to prevent adherence of silver thereto.

Other objects and advantages of the invention will become more apparent from the following detailed description of certain preferred embodiments thereof.

Mirrors are ordinarily prepared by pouring a silvering solution over the upper surface of a glass sheet maintained in a horizontal position. The excess of the silvering solution flows over the edges of the sheet and is drawn onto the under surface of the sheet where silver is also deposited. This silver partially covering what is to be the face of the mirror must be removed, an operation which increases production costs.

Various attempts have been made to prevent the silvering solution from flowing onto the under glass surface, but they have not been uniformly successful. For example, it has been proposed to create a dam about the margins of the glass sheet in order to prevent an overflow of the silvering solution. This operation reduces the rate of production and does not lend itself to a continuous process wherein the glass sheets are handled on a conveyor system. Paint or lacquer coatings for the mirror face will protect the glass from the deposition of silver but the removal of the protective coating is as difficult and as expensive as the removal of the silver.

Briefly stated, the present invention contemplates the application of a desensitizing solution to the surface of the glass sheet opposite the surface upon which silver is to be deposited to prevent adherence of silver thereto.

In preparing mirrors, sheets of glass are cleaned to remove any grease and alkalies and placed in a horizontal position upon a table or conveyor. The upper surfaces of the sheets are then treated with a solution of stannous chloride, blocked and rinsed with distilled water to make them receptive to silver. A silvering solution, comprising a silver salt and a reducing agent, is poured over the prepared surfaces and metallic silver deposits on the glass. During this operation, the excess of the silvering solutions flows over the sheet and is drawn back onto the under surface of the sheet where metallic silver is also deposited.

I have discovered that by applying a solution of tin chloride, either stannic chloride or stannous oxychloride, to the under surface of the glass, prior to the silvering operation, it is possible to prevent the silver deposited from the silvering solution from adhering to the glass. It is believed that the tin chloride desensitizes the glass surface to the extent that no silver nuclei attach to the glass, although it is possible that the tin chloride alters the nature of the silver being deposited. The tin solution does free the under surface of the glass from the objectionable silver films which are ordinarily formed thereon.

The desensitizing solution comprises an aqueous solution of $SnCl_4.5H_2O$ in concentrations of from 0.05 per cent to saturation with or without the addition of hydrochloric acid. Optimum protection has been obtained by using a solution containing 10 per cent by weight of $SnCl_4$.

Stannous chloride, in concentrations of from 0.001 per cent to saturation in an aqueous solution which has been aerated to convert the chloride into the oxychloride may also be used.

The desensitizing solution may be sprayed, rolled or otherwise applied to the surface of the glass which is to be protected. The coating remains effective even after it is dry and glass sheets may be treated for some time prior to being silvered. When the protection is no longer required, the coating is easily removed by washing and the glass surface is restored to its original condition. This feature insures a mirror face free from defects.

It will be understood that various modifications in the concentrations of the desensitizing tin solutions and the manner of application are possible without departing from the spirit of the invention or the scope of the appended claims.

What I claim is:

1. In the process of manufacturing mirrors having one silvered surface and one unsilvered surface which process includes the deposition of metallic silver from a solution of a silver salt and a reducing agent upon the upper surface of a glass sheet maintained in a horizontal position, the step which comprises applying a desensitizing solution from a class consisting of stannous oxychloride and stannic chloride to the under surface of the glass sheet to prevent adherence thereon of silver from the silvering solution overflowing the upper surface and contacting the under surface.

2. In the process of manufacturing mirrors having one silvered surface and one unsilvered surface which process includes the deposition of metallic silver from a solution of a silver salt and a reducing agent upon the upper surface of a glass sheet maintained in a horizontal position, the step which comprises applying a solution of stannic chloride to the under surface of the glass sheet to prevent adherence thereon of silver from the silvering solution overflowing the upper surface and contacting the under surface.

3. In the process of manufacturing mirrors having one silvered surface and one unsilvered surface which process includes the deposition of metallic silver from a solution of a silver salt and a reducing agent upon the upper surface of a glass sheet maintained in a horizontal position, the step which comprises applying a solution of stannous oxychloride to the under surface of the glass sheet to prevent adherence thereon of silver from the silvering solution overflowing the upper surface and contacting the under surface.

4. In the process of manufacturing mirrors having one silvered surface and one unsilvered surface which process includes the deposition of metallic silver from a solution of a silver salt and a reducing agent upon the upper surface of a glass sheet maintained in a horizontal position, the step which comprises applying an aqueous solution containing approximately 10 per cent of stannic chloride to the under surface of the glass sheet to prevent adherence thereon of silver from the silvering solution overflowing the upper surface and contacting the under surface.

ELMER J. BALLINTINE.